United States Patent
Soni

(10) Patent No.: US 10,432,700 B2
(45) Date of Patent: Oct. 1, 2019

(54) CONVERSATION CONNECTED VISUALIZATION OF ITEMS BASED ON A USER CREATED LIST

(71) Applicant: MICROSOFT TECHNOLOGY LICENSING, LLC, Redmond, WA (US)

(72) Inventor: Shahil Soni, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 229 days.

(21) Appl. No.: 15/349,000

(22) Filed: Nov. 11, 2016

(65) Prior Publication Data

US 2018/0136791 A1 May 17, 2018

(51) Int. Cl.
*H04L 29/08* (2006.01)
*G06T 11/20* (2006.01)
*H04L 12/58* (2006.01)

(52) U.S. Cl.
CPC ............ *H04L 67/10* (2013.01); *G06T 11/206* (2013.01); *H04L 51/046* (2013.01); *H04L 51/10* (2013.01); *G06T 2200/24* (2013.01); *H04L 51/08* (2013.01)

(58) Field of Classification Search
CPC . G06F 17/30905; H04L 67/10; H04L 51/046; H04L 51/10; H04L 51/08; G06T 11/206; G06T 2200/24
See application file for complete search history.

(56) References Cited

U.S. PATENT DOCUMENTS

| 6,594,673 | B1 * | 7/2003 | Smith | G06F 17/30873 |
| 7,945,627 | B1 * | 5/2011 | Musat | G06Q 10/107 |
| | | | | 709/200 |
| 8,380,716 | B2 | 2/2013 | Mirus | |
| 2003/0069931 | A1 * | 4/2003 | Omura | G06F 3/0481 |
| | | | | 709/205 |
| 2003/0177136 | A1 * | 9/2003 | Alpert | G06N 5/02 |
| 2005/0154701 | A1 * | 7/2005 | Parunak | G06F 17/30705 |

(Continued)

OTHER PUBLICATIONS

Saelan, et al., "Generating Mind Map from Indonesian Text Using Natural Language Processing Tool", In Journal of Procedia Technology, vol. 11, Dec. 2013, pp. 1163-1169.

(Continued)

*Primary Examiner* — Ryan F Pitaro
(74) *Attorney, Agent, or Firm* — Michael Best & Friedrich LLP

(57) ABSTRACT

Conversation connected visualization of items based on a user created list is provided. In some examples, a user may indicate the entry of a list of items to be visualized or user, intent may be inferred from an entered list in an email or similar communication. Connections between the items on the list may be determined and a connected node visualization generated. The visualization may be presented within a user interface in conjunction with the email and users allowed to define or characterize nodes or items in the visualization. Depending on a type of item, different prompts to provide definition/characterization input may be presented. The visualization may be associated with the communication and a conversation to winch the communication belongs. Users may access the visualization through a separate application or through the communication application.

16 Claims, 12 Drawing Sheets

(56) References Cited

U.S. PATENT DOCUMENTS

| | | | | |
|---|---|---|---|---|
| 2006/0117067 | A1* | 6/2006 | Wright | G06F 17/30017 |
| 2007/0186168 | A1* | 8/2007 | Waldman | G06F 17/214 |
| | | | | 715/732 |
| 2009/0119584 | A1 | 5/2009 | Herbst | |
| 2010/0070848 | A1* | 3/2010 | Holdaway | G06F 17/212 |
| | | | | 715/234 |
| 2010/0088605 | A1* | 4/2010 | Livshin | G06F 17/212 |
| | | | | 715/731 |
| 2010/0313106 | A1* | 12/2010 | Callens | G06F 17/24 |
| | | | | 715/201 |
| 2011/0196862 | A1* | 8/2011 | Bergman | G06F 17/3002 |
| | | | | 707/728 |
| 2011/0264705 | A1* | 10/2011 | Diamond | G06F 17/218 |
| | | | | 707/803 |
| 2013/0097167 | A1* | 4/2013 | St. Jacques, Jr. | |
| | | | | G06F 17/30011 |
| | | | | 707/737 |
| 2013/0117012 | A1* | 5/2013 | Orlin | G06Q 10/00 |
| | | | | 704/9 |
| 2013/0117060 | A1* | 5/2013 | Henriksen | G06Q 10/06 |
| | | | | 705/7.21 |
| 2013/0159209 | A1* | 6/2013 | Zhao | G06Q 30/02 |
| | | | | 705/348 |
| 2013/0179771 | A1* | 7/2013 | Dent | G06F 17/211 |
| | | | | 715/234 |
| 2013/0268916 | A1* | 10/2013 | Misra | G06F 8/74 |
| | | | | 717/123 |
| 2013/0317994 | A1* | 11/2013 | Tran | G06Q 50/184 |
| | | | | 705/310 |
| 2014/0200944 | A1* | 7/2014 | Henriksen | G06Q 10/1095 |
| | | | | 705/7.19 |
| 2014/0207776 | A1* | 7/2014 | Harris | G06F 17/30976 |
| | | | | 707/737 |
| 2016/0092336 | A1* | 3/2016 | Atanasiu | G06F 11/323 |
| | | | | 717/133 |
| 2016/0162819 | A1* | 6/2016 | Hakman | G06Q 10/0633 |
| | | | | 705/7.27 |
| 2016/0283494 | A1* | 9/2016 | Krishnaswamy | |
| | | | | G06F 17/30663 |
| 2016/0314104 | A1* | 10/2016 | Phillips | G06F 17/2294 |
| 2016/0323224 | A1* | 11/2016 | Stein | H04L 51/22 |
| 2016/0342678 | A1* | 11/2016 | Newman | G06F 3/0484 |
| 2016/0357718 | A1* | 12/2016 | Gelfand | G06F 17/2264 |
| 2016/0364377 | A1* | 12/2016 | Krishnamurthy | G06F 17/271 |
| 2017/0075904 | A1* | 3/2017 | Hedges | G06F 17/30734 |
| 2017/0220859 | A1* | 8/2017 | Grams | G06T 7/13 |

OTHER PUBLICATIONS

"MindView—Features", Published on: Jan. 3, 2010 Available at: http://www.matchware.com/en/products/mindview/features.htm.

Elhoseiny, et al., "English2MindMap: an Automated System for MindMap Generation from EnglishText", In Proceedings of IEEE International Symposium on Multimedia, Dec. 10, 2012, 6 pages.

"Text2Mindmap", Retrieved on: Sep. 1, 2016 Available at: https://www.text2mindmap.com/.

Kudeli, et al., "Mind Map Generator Software Model with Text Mining Algorithm", In Proceedings of 33rd International Conference on Information Technology Interfaces, Jun. 27, 2011, pp. 487-494.

"XMind", Retrieved on: Sep. 1, 2016 Available at: http://www.xmind.net/features/.

"The SimpleMind Mind Map Editor", Retrieved on: Sep. 1, 2016 Available at: http://www.simpleapps.eu/simplemind/touch/quickhelp.

"Luma7", Retrieved on: Sep. 1, 2016 Available at: http://luma7.com/.

"Inforapid Knowledgebase Builder 4.9", Retrieved on: Sep. 1, 2016 Available at: http://www.buildyourmap.com/.

Elhoseiny, et al., "Text to Multi-level MindMaps: A Novel Method for Hierarchical Visual Abstraction of Natural Language Text", In International Journal of Multimedia Tools and Applications, vol. 75, No. 8, Apr. 2016, pp. 1-31.

"Collaborative Mind Mapping", Retrieved on: Sep. 1, 2016 Available at: https://www.mindmeister.com/.

Purwarianti, et al., "Natural Language Understanding Tools with Low Language Resource in Building Automatic Indonesian Mind Map Generator", In International Journal on Electrical Engineering and Informatics, vol. 5, No. 3, Sep. 2013, pp. 256-269.

* cited by examiner

CONVERSATION CONNECTED VISUALIZATION OF ITEMS BASED ON A USER CREATED LIST

BACKGROUND

Email is a destination for not just information workers, but most people today, where content is created and collaborations are performed. Email (and similar communications) are largely text-based, which makes collaboration, managing tasks, scheduling discussions or meetings a challenge. Repeated exchanges of text messages, conversion of entailed items into well-organized documents or other forms of information storage can be burdensome and frustrating for many people.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing conversation connected visualization of items based on a user created list. In some examples, a list of items may be received in a communication. Multiple connections between the items on the list may be determined and a visualization of the items and the connections generated, where the items are represented as nodes. One or more prompts may be provided to allow a user to define or characterize the items and the visualization may be associated with a conversation that includes the communication.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
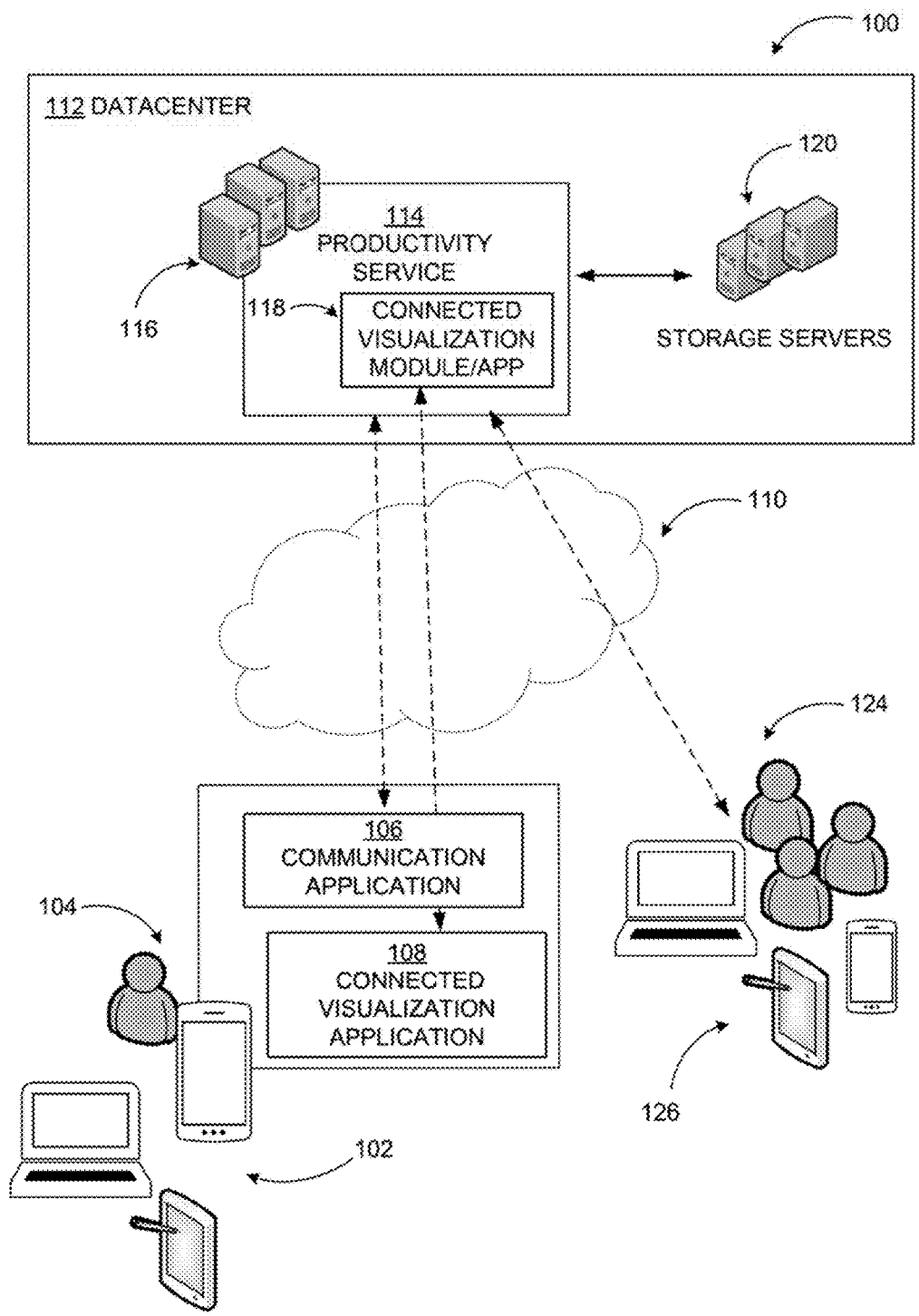
FIG. 1 includes an example network environment where a system to provide conversation connected visualization of items based on a user created list may be implemented.

As briefly described above, embodiments are directed to conversation connected visualization of items based on a user created list. In some examples, a user may indicate the entry of a list of items to be visualized or user intent may be inferred from an entered list in an email or similar communication. Connections between the items on the list may be determined and a connected node visualization generated. The visualization may be presented within a user interface in conjunction with the email and users allowed to define or characterize nodes or items in the visualization. Depending on a type of item, different prompts to provide definition/characterization input may be presented. The visualization may be associated with the communication and a conversation to which the communication belongs. Users may access the visualization through a separate application or through the communication application.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules tat execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including, hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing conversation connected visualization of items based on a user created list. Examples of platforms include, but are not limited to, a hosted service executed over a plurality of servers, an application executed on a single computing device, and comparable systems. The term "server" generally refers to a computing device executing one, or more software programs typically in a networked environment. However, a server may also be implemented as a virtual server (software programs) executed on one or more computing devices viewed as a server on the network. More detail on these technologies and example operations is provided below.

FIG. 1 includes an example network environment where a system to provide conversation connected visualization of items based on a user created list may be implemented.

As illustrated in diagram 100, an example system may include a datacenter 112 hosting a cloud-based productivity service 114 configured to provide communication, document processing, presentation, calendar management, and comparable services that may be accessed across multiple devices and users. The datacenter 112 may include one or more processing servers 116 configured to execute the productivity service 114, among other components. In some embodiments, at least one of the processing servers 116 may be operable to manage the productivity service 114, where data from devices (such as devices 102 and 126) may be stored at storage servers 120 (or associated data stores). The productivity service 114 may include, among other modules and applications, a connected visualization module or application 118, which may be configured to analyze a list of items provided by a user, determine connections between the items, and create a visualization, allowing the user to add attributes and functionality to the items on the visualization and connecting the visualization with a communication or conversation. As described herein, the productivity service 114 may be implemented as software, hardware, or combinations thereof.

It some embodiments, the productivity service 114 may be configured to interoperate with various applications to provide its services. For example, as illustrated in the diagram 100, a user 104 may execute a thin (e.g., a web browser) or a thick (e.g., a locally installed client application) version of a communication application 106 through the device 102 with which the productivity service 114 may be configured to integrate and interoperate with over one or more networks, such as network 110. Similarly, connected visualization application 108 may be an application to provide access to visualizations independently or through a communication. The communication application 106 and the connected visualization application 108 may be applications hosted by the communication service, such as clients, for example. The device 102 may include a desktop computer, a laptop computer, a tablet computer, a vehicle mount computer, a smart phone, or a wearable computing device, among other similar devices. A communication interface may facilitate communication between the productivity service 114 and the communication application 106 or connected visualization application 108 over the network 110.

In an example embodiment, the connected visualization module or application 118 of the productivity service 114 may receive a list of items in a communication. The module or application may detect/determine multiple connections between the items on the list and create a visualization of the items and the connections, where the items are represented as nodes. One or more prompts may be provided to allow a user to define or characterize the items and the visualization may be associated with a conversation that includes the communication. The visualization may be provided to be displayed by the communication application 106 or connected visualization application 108 in conjunction with the conversation.

A system according to embodiments allows conversation connected visualization of items based on a user created list by generating a connected visualization based on a list of items and allowing a user to define and characterize nodes and connections, thereby consolidating a broad spectrum of information in a user-friendly presentation. Moreover, various functions such as activation of communications, links to different applications, etc. may be integrated into the visualization at the node level. By allowing consolidation and presentation of information, increased collaboration and efficiency, reduced local and cloud computing resource usage, reduced bandwidth usage, and increased security may be achieved.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users managing information.

Figure 2:
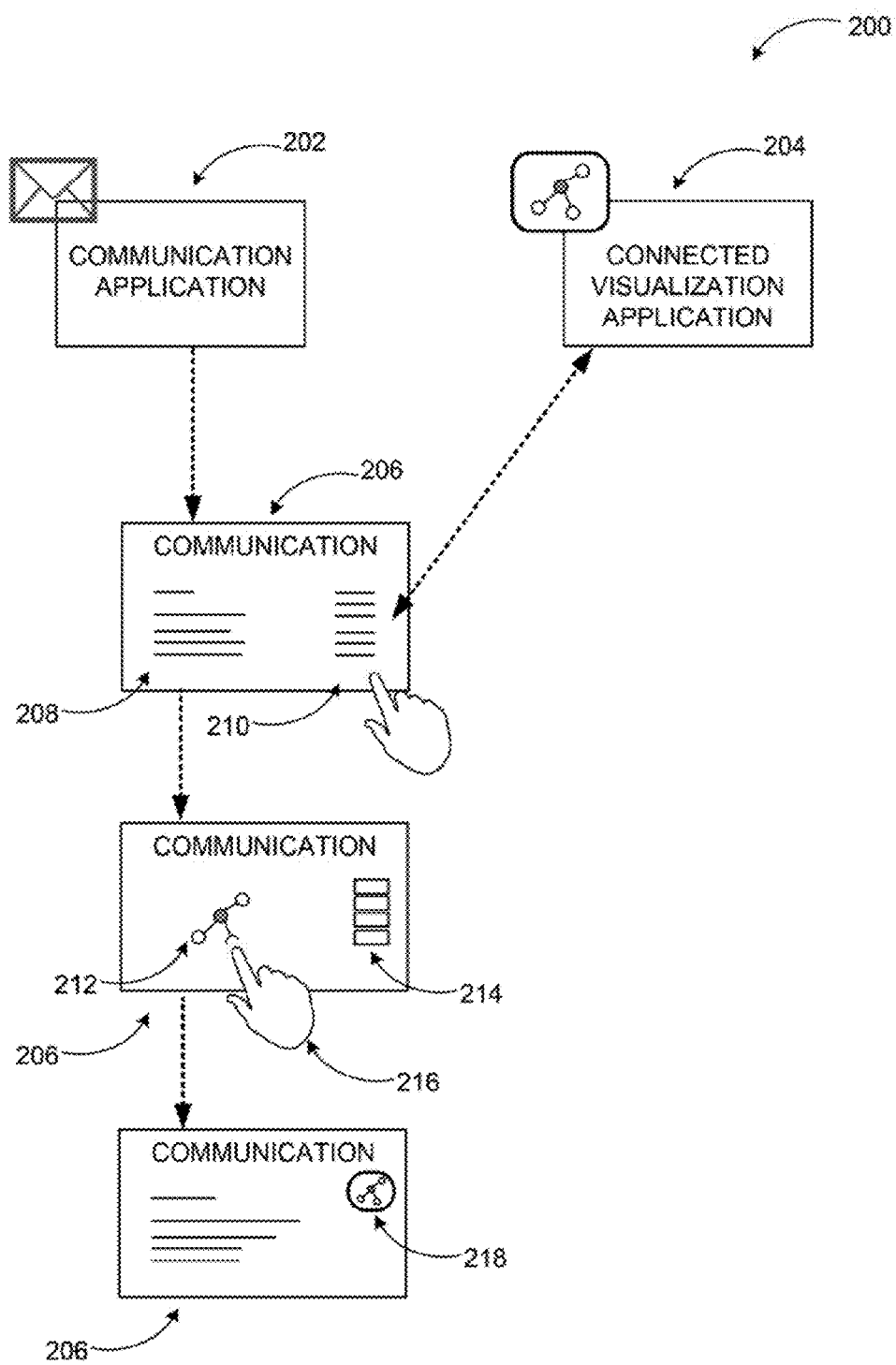
FIG. 2 illustrates conceptually how conversation connected visualization of items based on a user created list may be implemented.

FIG. 2 illustrates conceptually how conversation connected visualization of items based on a use created list may be implemented.

As shown in diagram 200, a user may indicate the entry of a list 210 of items to be visualized or user intent may be inferred from an entered list 210 in an email or similar communication 206 managed by a communication application 202. For example, the list may be typed (or entered through speech) on a dedicated user interface or on the communication user interface next to the body 208 of the comnunication.

A connected visualization application 204 may determine connections between the items on the list and types of items. The connected visualization application 204 may then generate a connected node visualization 212. The visualization 212 may be presented within a user interface in conjunction with the communication 206. Users may be allowed to define or characterize nodes or items in the visualization. Depending on a type of item, different prompts 214 to provide definition/characterization input may be presented. The visualization may be associated with the communication and a conversation to which the communication belongs. A control element 218 may be provided, for example, for users to access the visualization through a separate application or through the communication application.

The connected visualization of the items may be a focused container of information with interactive features for a user. In one example scenario, the items may represent different phases of a project. People, scheduling items, notes, attachments, and other useful data may be, associated with each item (phase). The connections may provide a visual representation of relationships between the items. Interactive features may include launching of various applications to view, create, edit different attachments of attributes (e.g., communication with a person, scheduling of a meeting, etc.), and similar ones. In another scenario, the items may represent people in a specific group and attributes, documents, and other features may be added to each person's representation such that a variety of functionality and visual representation of relationships between the people in the specific group can be provided through a single user interface.

Moreover, each connected visualization may be associated with a communication or a conversation of multiple communications. Multiple visualizations may be associated with a single communication too. Thus, the communication may be used to present the visualization, a summary view of the visualization, or access to the visualization through a dedicated application.

Figure 3:
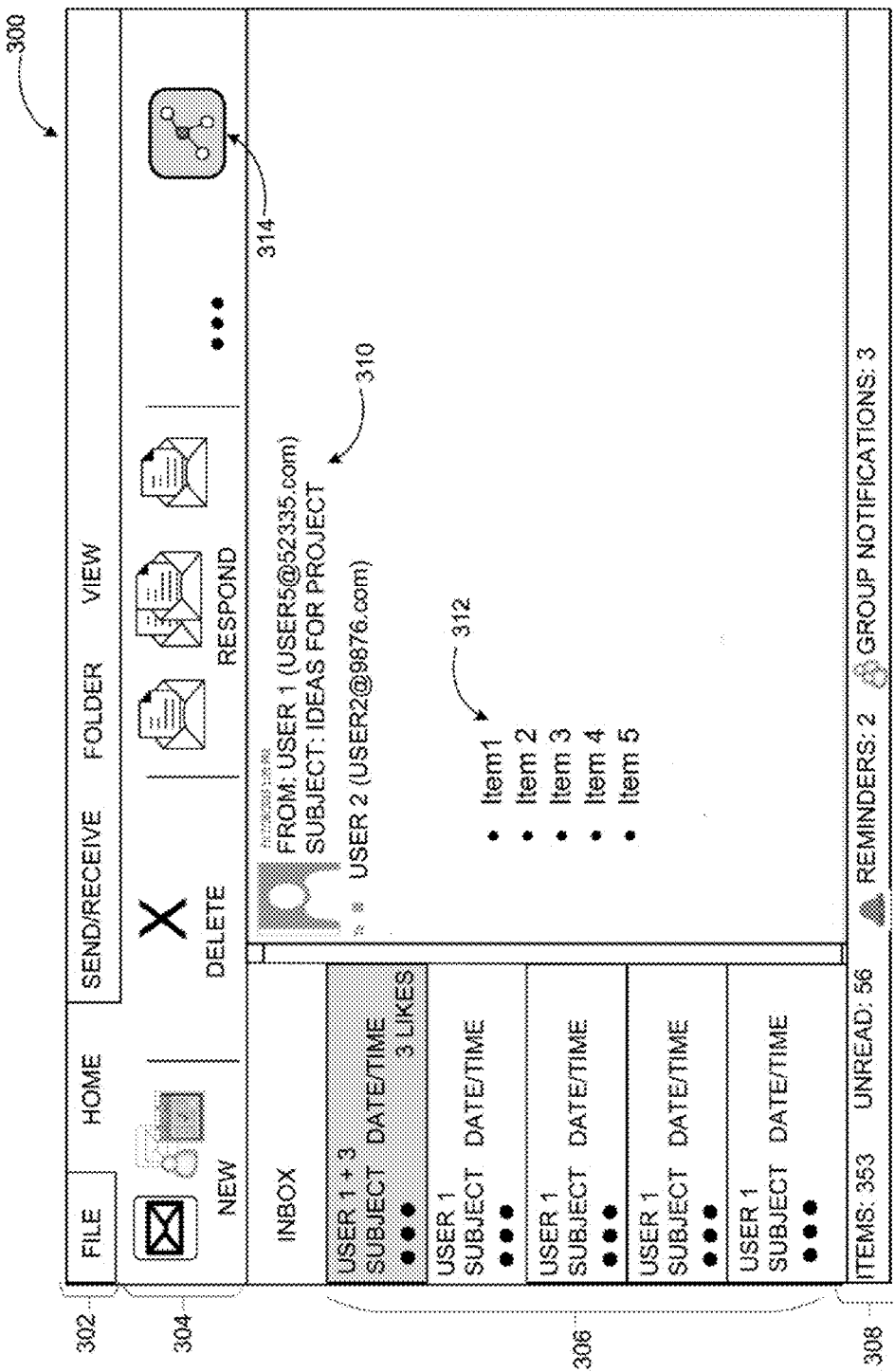
FIG. 3 illustrates an example email user interface where conversation connected visualization of items based on a user created list may begin with entry of a list of items.

FIG. 3 illustrates an example email user interface where conversation connected visualization of items based on a user created list may begin with entry of a list of items.

User interface 300 in FIG. 3 is a typical email user interface with various functionality tabs 302, command section 304, inbox view 306, and summary information section 308. In some embodiments, a user may input a bulleted or numbered list of items 312 into a body 310 of an email. A connected visualization module within the communication application or service may detect the list and infer that a visualization needs to be created. In other examples, a connected visualization activation element 314 may be provided in the command section 304 or other place on the user interface 300 and the visualization generated upon selection of the activation element.

Embodiments are not limited to generation of connected visualizations from lists of items In some examples, the items and connections may be inferred from a paragraph of text using natural language processing. Shapes, colors, and similar format, as well as a layout of items in the visualization may be selected based on a type of the items and the relationships in some examples.

Example user interface and functionality are discussed using entails, as example environment for conversation connected visualizations of items based on a user created list. Embodiments are not limited to entails. Conversation connected visualizations of items based on a user created list may also be created in other communications such as text messages, online conference exchanges, and similar ones. Furthermore, conversation connected visualizations of items based on a user created list may be created from within documents such as word processing documents, presentation documents, notebook documents, and similar ones. Connected visualizations as discussed, herein may be generated and managed by, dedicated applications or modules. In some examples, the modules may be integrated with other applications such as a communication application, a calendar application, a word processing application, a presentation application, a notebook application, and similar ones.

FIG. 4A through 4E illustrate example email user interfaces following generation of conversation connected visualizations of items based on a user created list.

Figure 4A:
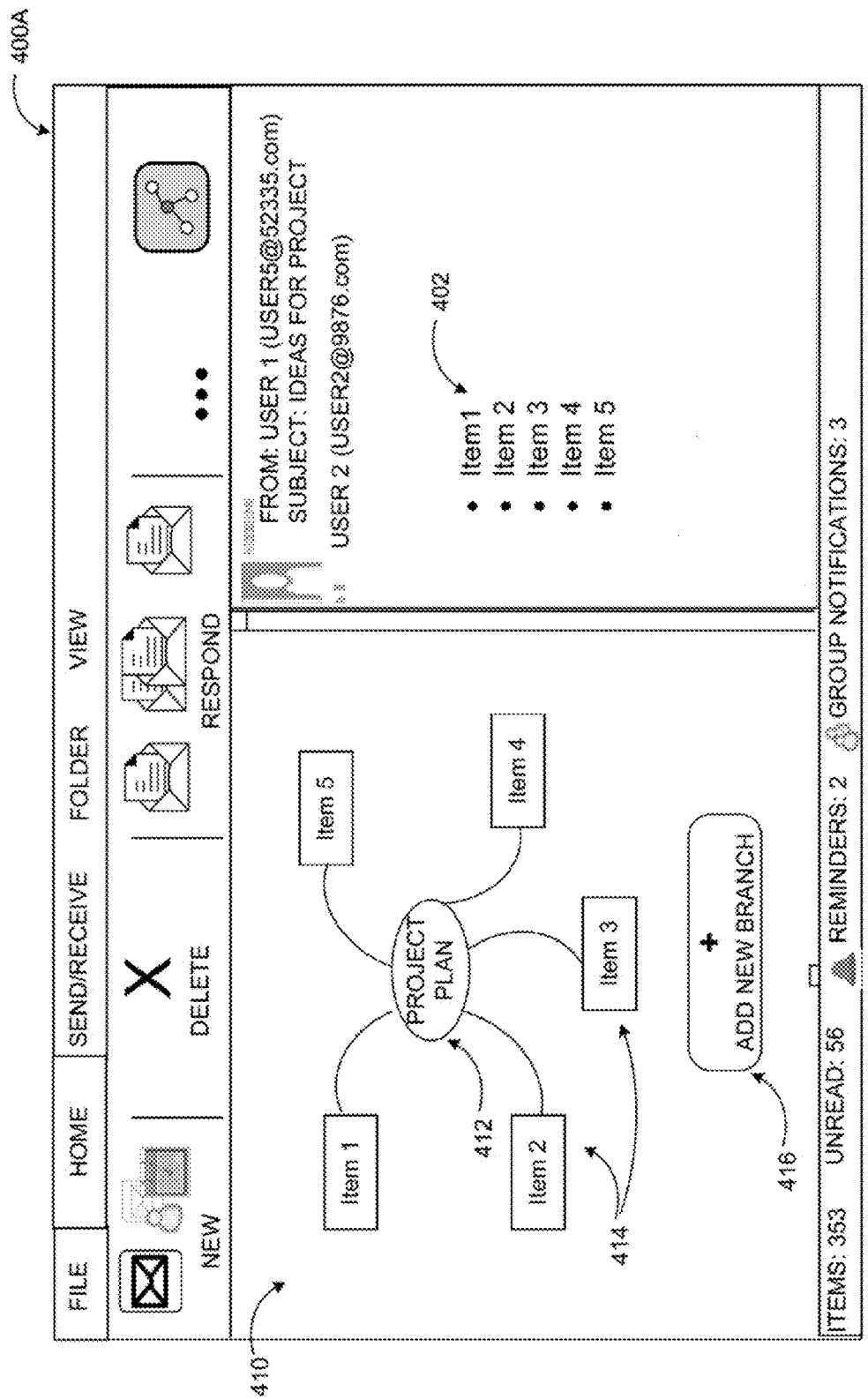
FIG. 4A through 4E illustrate example email user interfaces following generation of conversation connected visualizations of items based on a user created list.

User interface 400A in FIG. 4A is an example first stage of generating a connected visualization. Upon detection of a list of items 402 in a body of an email, a separate visualization user interface 410 may be presented and the generated initial visualization displayed on the visualization user interface 410.

As discussed previously, the items may include an arbitrary number of things such as people, phases of a project, physical items, locations on a map, and many more. Depending on the connections (relationships between the items), the visualization ma represent a variety of scenarios. For example, items 414 may be phases of a project, the project represented by a root item 412. In another example, the items may represent people in a specific group, offices in a building, stores of a retail company, and so on.

A control 416 may allow users to add new items, and/or connections between items. New items of connections may also be created through actions on the visualization. For example, a swipe on an item may create a new connection, a tap may create a new item, etc. The user interface 410 may be within an email application user interface sharing available space with the displayed email or presented on a separate user interface. A shape, layout, and configuration of the connected visualization may be modified based on available display area, display device type (e.g., smart phone vs. desktop computer monitor), and comparable factors.

Figure 4B:
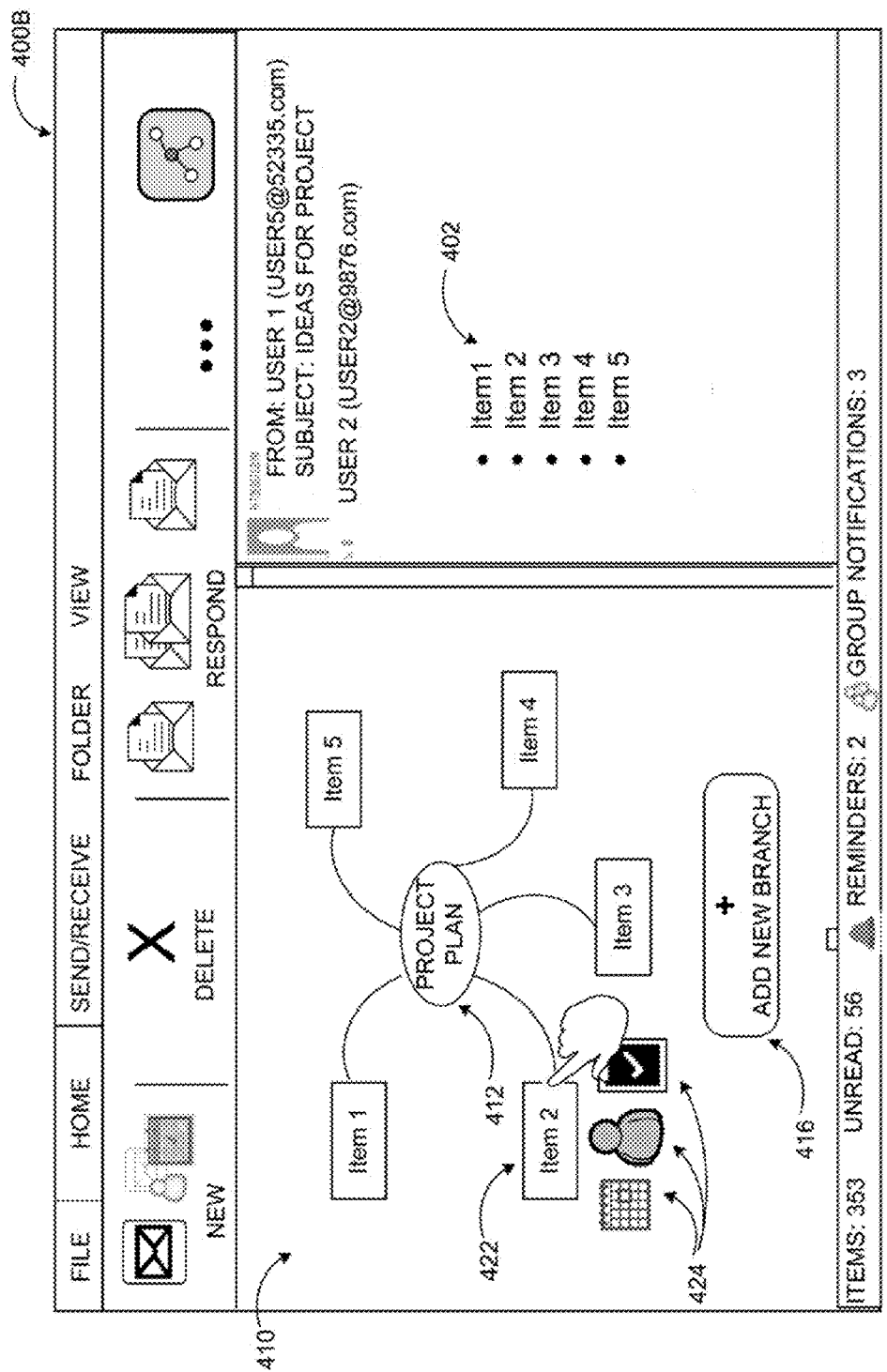

Diagram 400B in FIG. 4B shows another phase of connected visualization generation. Upon generation of the initial visualization, users may be allowed to add features, attributes, and sub-items to the items on the visualization. For example, calendar items, people information, tasks, notes, and attachments 424 may be added to one or more items 422 in the visualization.

The types of features, attributes, and sub-items to be added may vary depending on the types of the items. Different features, attributes, and sub-items may be made available for different items. The addition process may be started based on different triggers. A control element may be provided for the user to directly activate the feature. Prompts for adding features, attributes, and sub-items may be displayed upon detecting a user hovering over art item, etc. In some examples, the user may be provided with options to add a feature, an attribute, or a sub-item. In other examples, top choices for a particular item type may be provided automatically for the user to select.

Figure 4C:
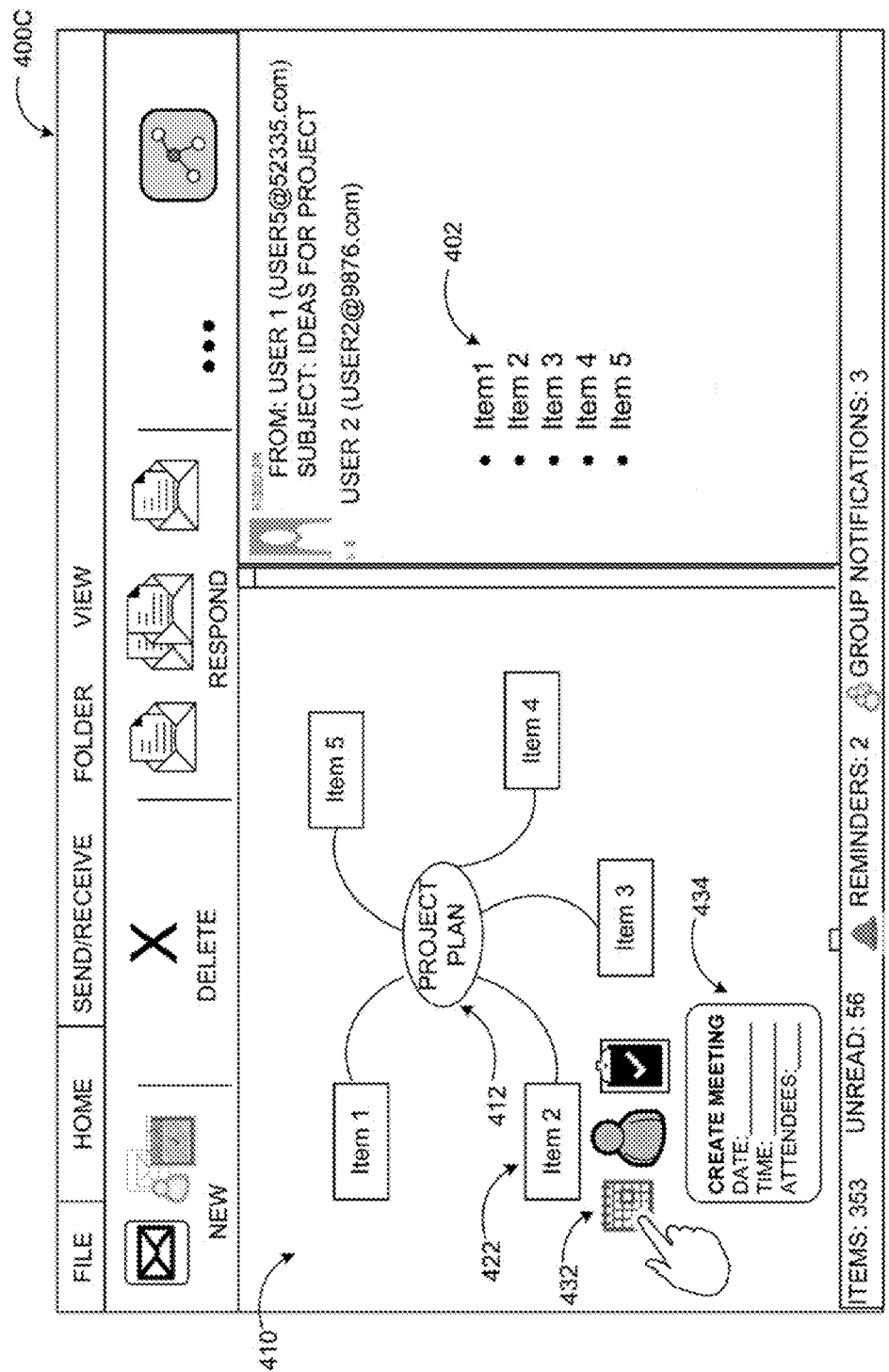

As shown in diagram 400C in FIG. 4C, a special prompt 434 may be presented upon user selection or indication of a desire to add a particular feature, attribute, or sub-item such as a calendar items 432. In an example scenario, the item 422 may be a project phase. The user may wish to add a meeting to the particular project phase. Thus, upon selection of the calendar item 432, the user may be allowed to enter desired date, time, attendees of the meeting. When the meeting is held, any content generated in the meeting may be stored along with the calendar item tied to the item 422. Thus, the user may be able to select item 422 and view and have access to all meetings (among other things) associated with that particular project phase.

Figure 4D:
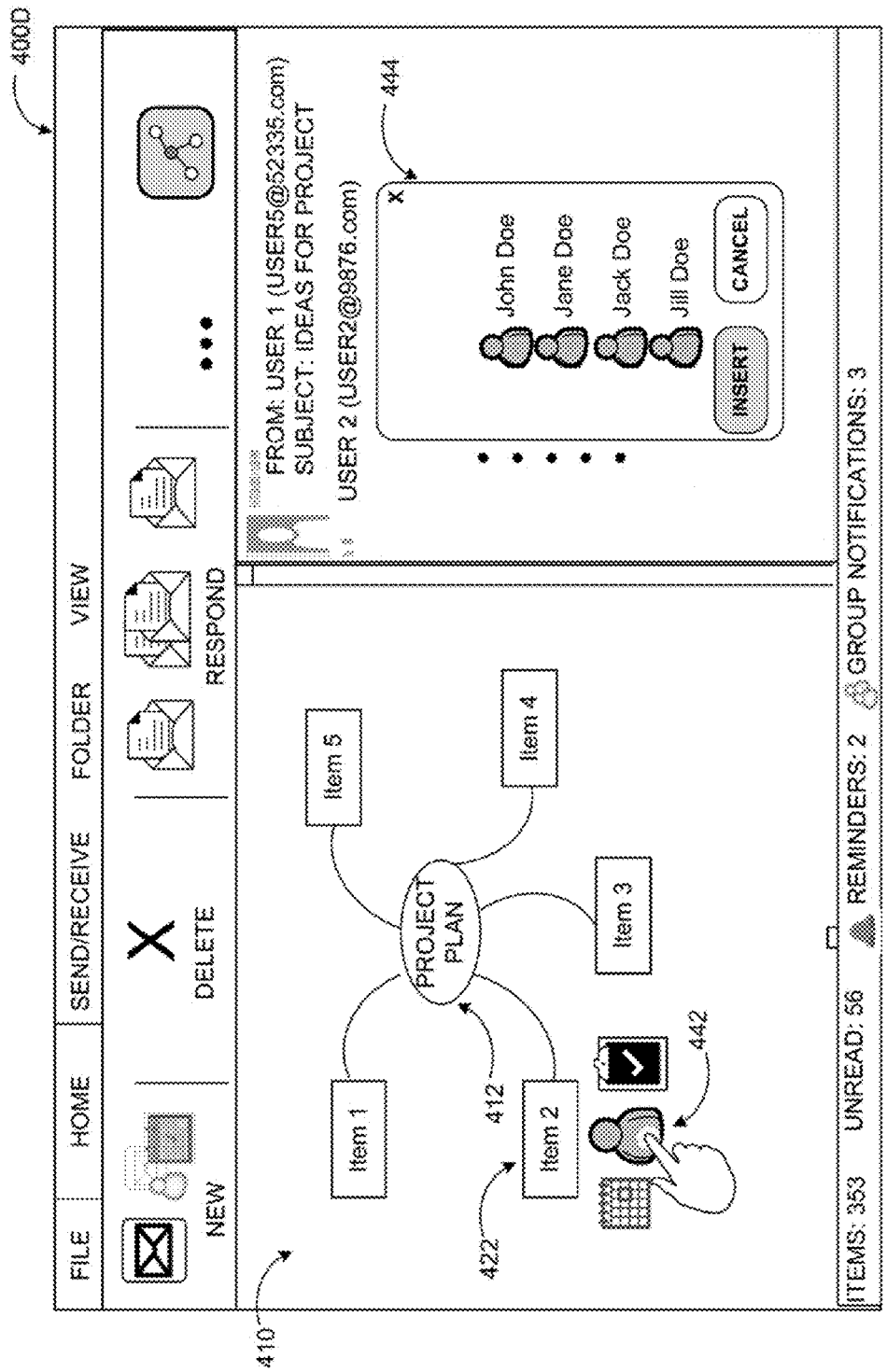

Diagram 400D of FIG. 4D shows another example sub-item being added to an item on a connected visualization. Following the above described example, the user may also wish to add people information to the project phase represented by the item 422. When the user hovers over the people icon 442, a dedicated prompt 444 may be displayed allowing the user to select users from a contact list, for example. In other examples, the user may be enabled to enter the people information manually. The people information may include contact information such as name, address, email, phone numbers, etc., but it may also include access to people's calendars (availability), their biographies, and any other relevant information. Interactive features that be added as part of the people information may include control to initiate a communication with select people, interactive maps to find the location of select people, etc.

Figure 4E:
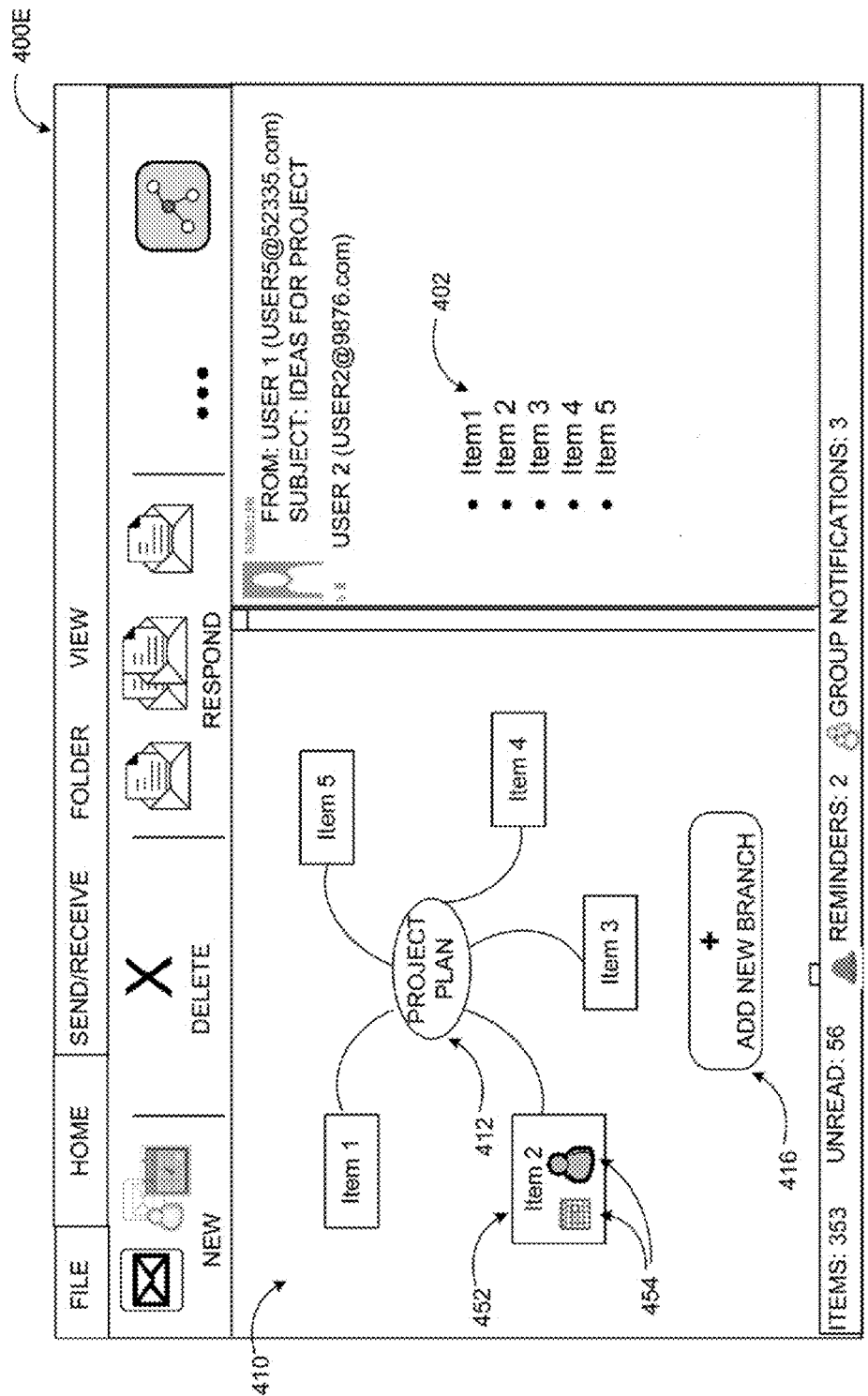

Diagram 400E in FIG. 4E shows a completed item 452 to which a calendar item and a people item 454 have been added. Thus, a user may access scheduled meetings, content created in meetings, people associated with the item, information associated with the people, and interactive features for the people in one action by clicking on the item 452, for example. Moreover, using the item 452 as a template, the user may be able to add sub-items to the other items in the visualization easily, create connections through the sub-items, etc.

Figure 5:
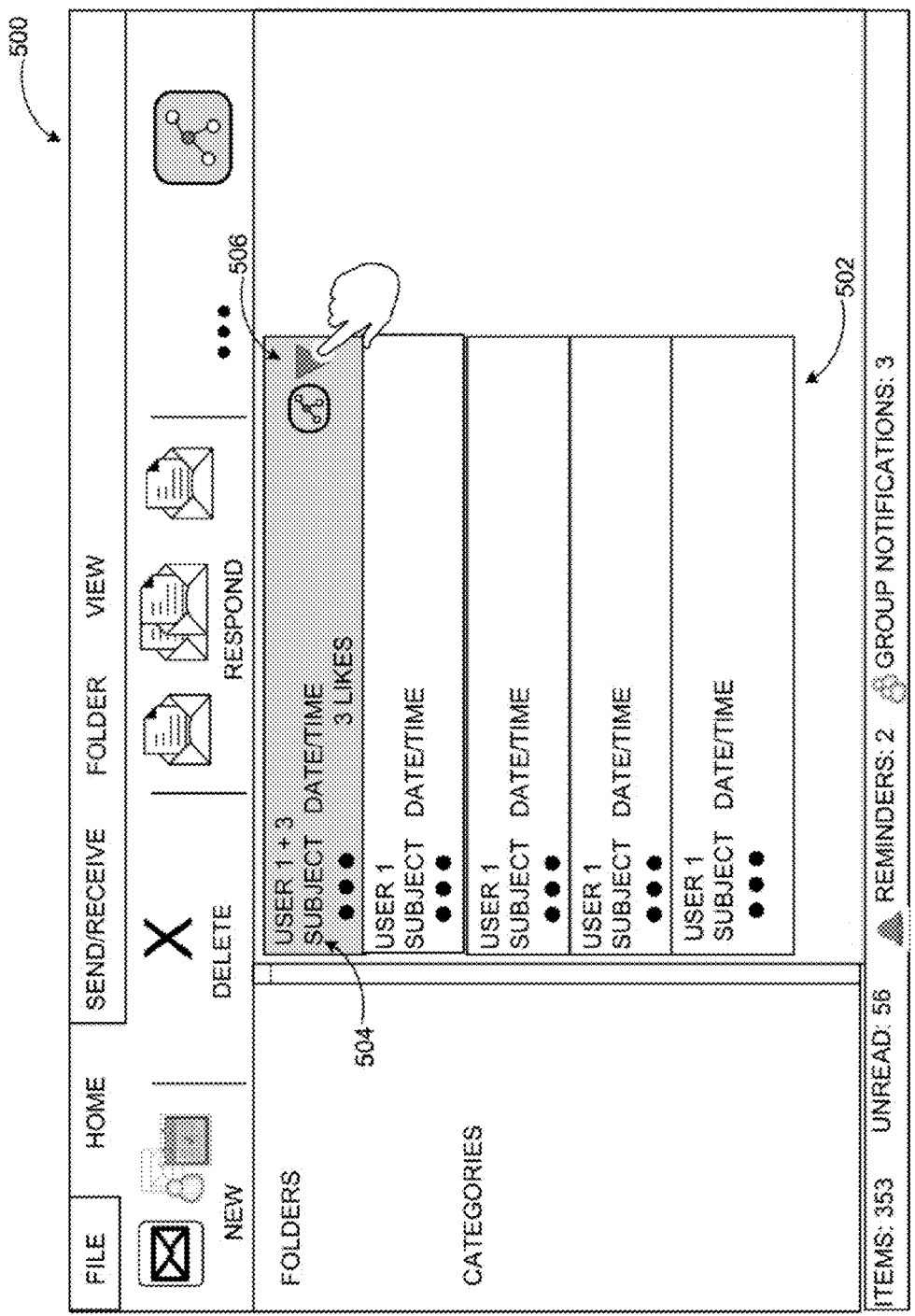
FIG. 5 illustrates an example email application user interface with an indication of an available conversation connected visualization.

FIG. 5 illustrates an example email application user interface with an indication of an available conversation connected visualization.

One or more connected visualizations may be generated and associated with different communications. In some examples, the available visualizations may be indicated through a control element 506 associated with communication 504 on user interface 500. The visualizations indicated by the control element 506 may be associated with communication 504 only or with the entire conversation 502 comprising multiple communications. In other examples, each communication associated with one or more visualizations may include its own control element indicator. Upon activation of the control element 506, the visualization user interface may be displayed on the communication application user interface or on a separate user interface. In case of multiple visualizations, a selection option may be presented first.

The visualization(s) may be stored in a separate data store and associated with communications or conversations. Alternatively, the visualization(s) may be stored along with the communications or conversations by the communication application (e.g., similar to attachments). Conversation connected visualizations of items based on a user created list may provide a collection of tools beyond note-taking, and allow users to become creative, remember more, and address challenges more effectively.

The examples provided in FIGS. 1 through 5 are illustrated with specific systems, services, applications, modules, codes, and notifications. Embodiments are not limited to environments according to these examples. Conversation connected visualization of items based on a user created list may be implemented in environments employing fewer or additional systems, services, applications, engines, codes, and user experience configurations. Furthermore, the example systems, services, applications, modules, and notifications shown in FIG. 1 through 5 may be implemented in a similar manner with other values using the principles described herein.

Figure 6:
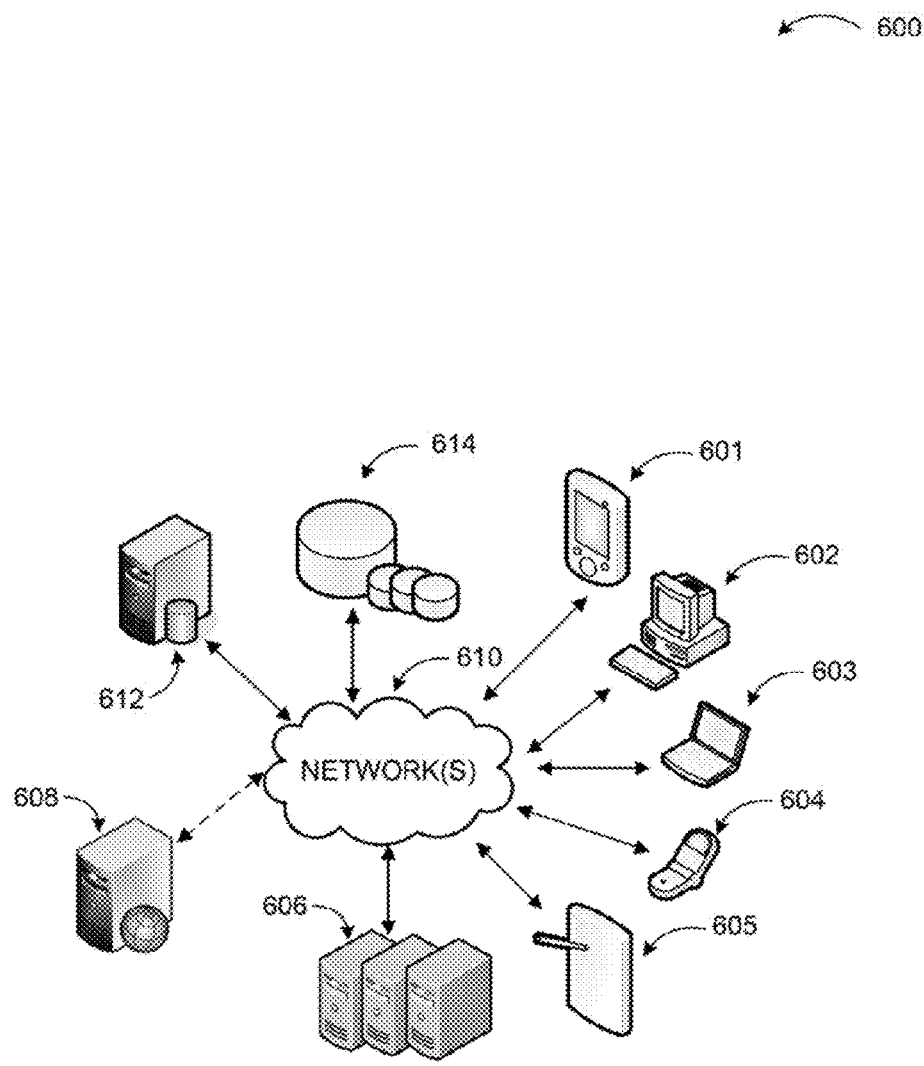
FIG. 6 is a networked environment, where a system according to embodiments may be implemented.

FIG. 6 is a networked environment, where a system according to embodiments may be implemented. In addition to locally installed applications (for example, application 106), conversation connected visualization of items based on a user created list may also be employed in conjunction with hosted applications and services (for example, a communication service 114) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data such as visualization data, and similar may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not network(s) 610 may include wireless media such as acoustic, RF, infrared and other wireless media.

Many other configurations of computing devices, applications, engines, data sources, and data distribution systems may be employed for providing conversation connected visualization of items based on a user created list. Furthermore, the networked environments discussed in FIG. 6 are for illustration purposes only. Embodiments are not limited to the example applications, engines, or processes.

Figure 7:
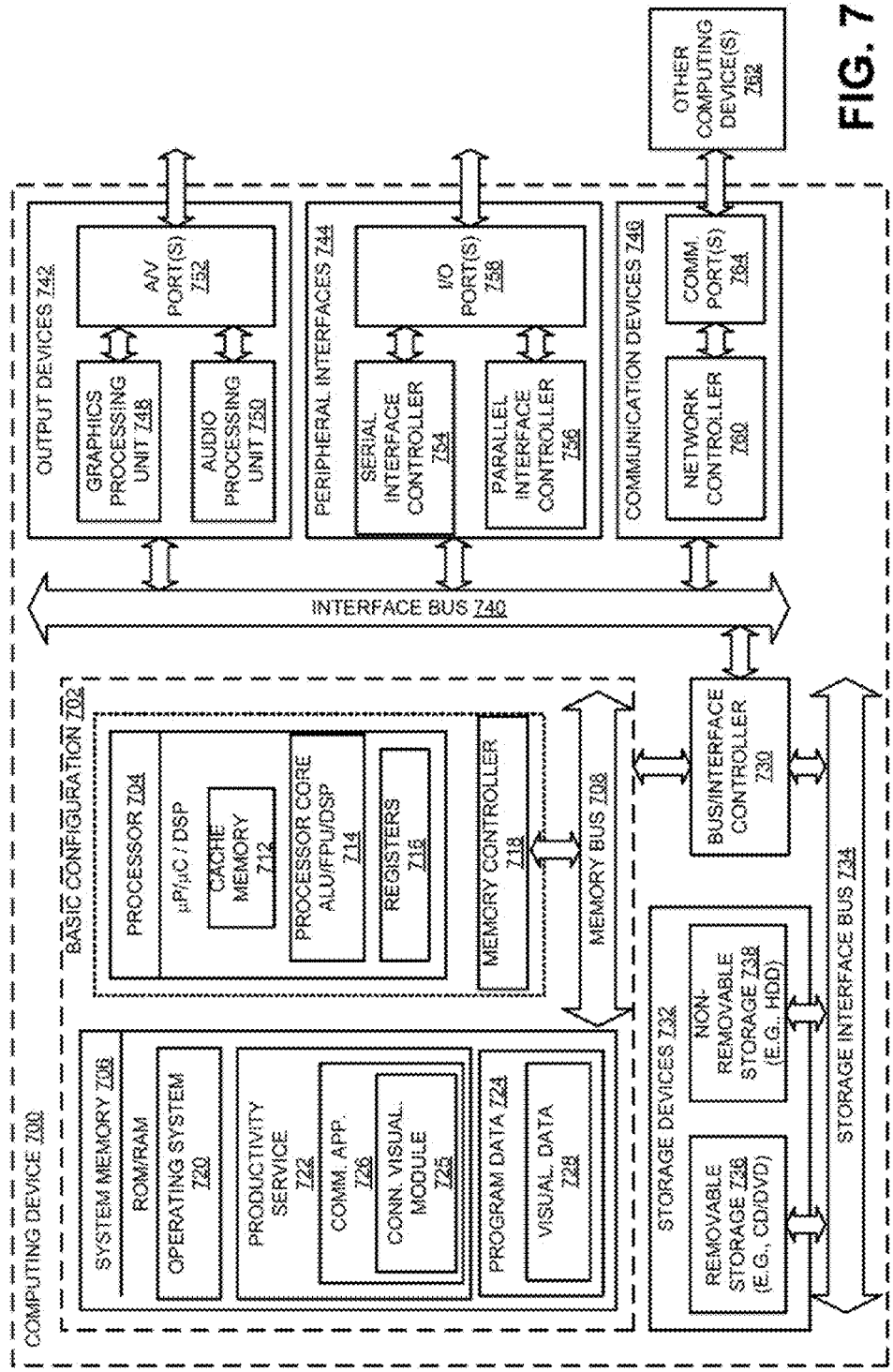
FIG. 7 is a block diagram of an example general purpose computing device, which may be used to provide conversation connected visualization of items based on a user created list.

FIG. 7 is a block diagram of an example general purpose computing device, which may be used to provide conversation connected visualization of items based on a user created list.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (μP), a microcontroller (μC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a productivity service 722, a communication application 726, a connected visualization module 725, and program data 724. The connected visualization module 725 may determine items to be visualized, for example, inserted into a communication, and facilitate creation, enrichment, and management of the visualization to contain a wide spectrum of information and functionality associated with the items. The program data 724 may include, among other data, visualization data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, cute communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide conversation connected visualization of items based on a user created list. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
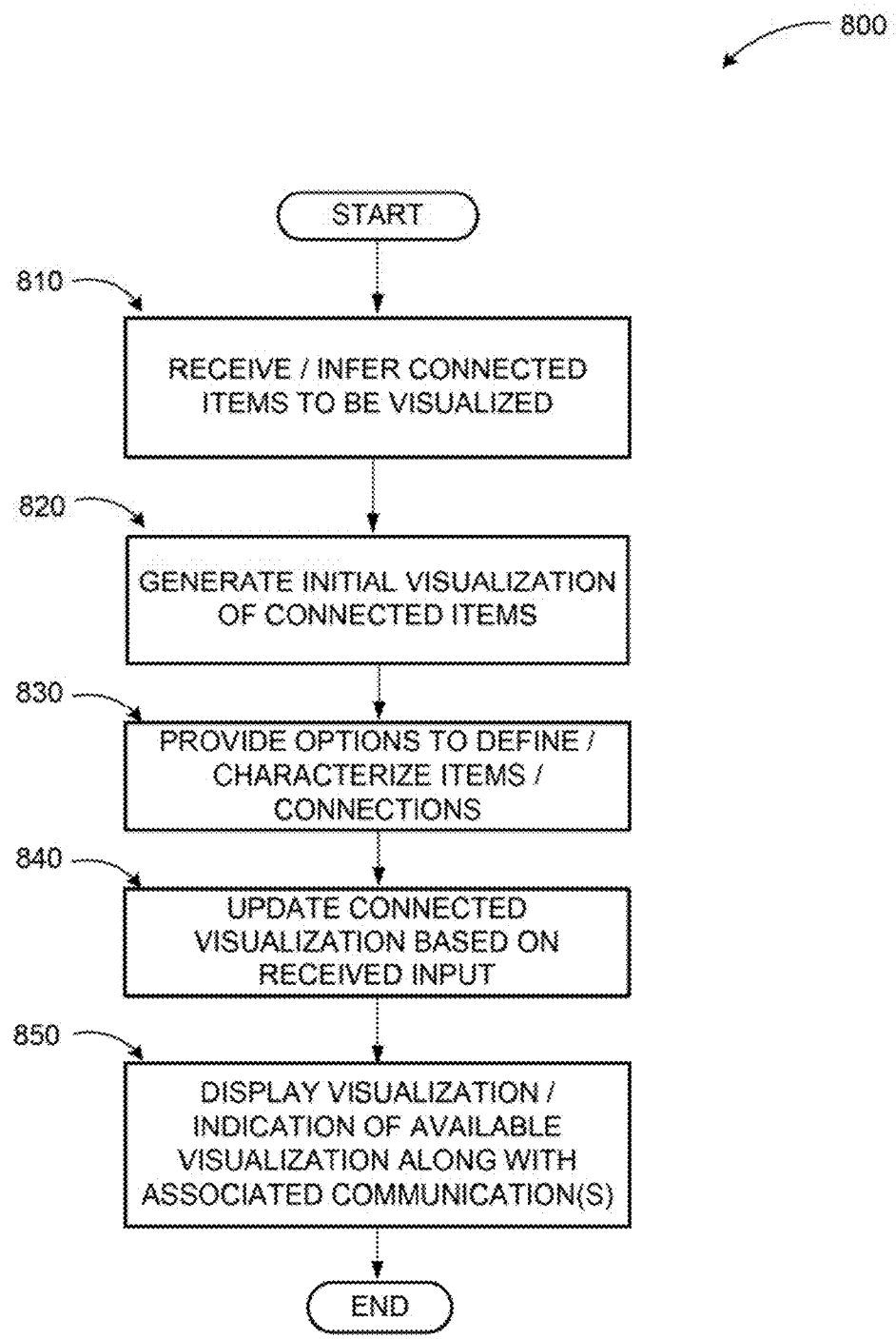
FIG. 8 illustrates a logic flow diagram of a method to provide conversation connected visualization of items based on a user created list.

FIG. 8 illustrates a logic flow diagram of a method to provide conversation connected visualization of items based on a user created list.

Process 800 may be implemented on a computing device, server, or other system. An example system may include a computer communicatively coupled to a cloud server hosting a productivity or a communication service.

Process 800 begins with operation 810, where items to be visualized may be received through direct input (e.g., list in a communication) or inferred (e.g., from a body of a communication or using natural language interpretation). Connections between the items may be determined along with types of items e.g., people, tasks, notes, calendar items, etc.). At operation 820, an initial visualization of the items may be generated, where the items are represented as nodes connected in various ways depending on the determined connections between the items.

At operation 830, a user (or multiple users) may be provided with prompts to define or characterize items on the visualization. The prompts may be different depending on the item type. For example, meeting scheduling information may be prompted to be entered for calendar items, contact information prompts may be provided for people, and so on. Some items may be of multiple types for example, people and calendar items.

At operation 840, the visualization may be updated based on received definition/characterization inputs). In some examples, interactive functionality may also be provided for the items such as links to activate various applications upon user interaction with an item. At operation 850, the visualization may be displayed or an indication that the visualization is available may be displayed in conjunction with one or more communications (e.g., conversation).

The operations included in process 800 are for illustration purposes. Conversation connected visualization of items based on a user created list may be implemented by similar processes with fewer or additional steps, as well as in different order of operations using the principles described herein. The operations described herein may be executed by one or more processors operated on one or more computing devices, one or more processor cores, specialized processing devices, and for general purpose processors, among other examples.

According to examples, a means for providing conversation connected visualization of items based on a user created list is described. The means may include a means for receiving a list of items in a communication; a means for determining a plurality of connections between the items on the list; a means for generating a visualization of the items and the plurality of connections; a means for providing one or more prompts to allow a user to define or characterize the items; a means for associating the visualization with a conversation that includes the communication; and a means for providing the visualization to be displayed by a client application in conjunction with the conversation.

According to some examples, a method to provide conversation connected visualization of items based on a user created list is described. The method may include receiving a list of items in a communication; determining a plurality of connections between the items on the list; generating a visualization of the items and the plurality of connections; providing one or more prompts to allow a user to define or characterize the items, associating the visualization with a conversation that includes the communication; and providing the visualization to be displayed by a client application in conjunction with the conversation.

According to other examples, receiving the list of items in the communication may include receiving one of a bulleted list and a numbered list entered into a body of the communication. Receiving the list of items in the communication may also include analyzing textual content entered into a body of the communication using natural language processing to derive the list of items. The method may include analyzing the list and the individual items to determine a type of the items and relationships between the items.

According to further examples, receiving the list of items in the communication may include inferring an indication to generate the visualization from an entry of the list of items or detecting activation of a visualization control on a user interface of the communication. The method may also include providing a first UI to display and receive feedback associated with the task in conjunction with a second UI to display the document. The method may further include presenting an option to add one or more sub-items to an item, wherein the sub-items are selected based on a type of the item; and presenting a prompt to enter or select information to be included with each of the added sub-items. The communication may be an email, a text message, or an online meeting exchange.

According to some examples, a computing device to provide conversation connected visualization of items based on a user created list is described. The computing device may include a communication interface configured to facilitate communication between the computing device and one or more servers; a memory configured to store instructions; and one or more processors coupled to the memory, where the one or more processors, in conjunction with the instructions stored in the memory, are configured to execute components of a communication service. The components of the communication service may include an application configured to provide processing capability associated with a document; a communication application configured to facilitate exchange of communications between users; and a connected visualization module. The connected visualization module may be configured to receive a list of items in a communication based on analysis of textual content entered into a body of the communication using natural language processing, or receipt of one of a bulleted list and a numbered list entered into the body of the communication; determine a plurality of connections between the items on the list; generate a visualization of the items and the plurality of connections, provide one or more prompts to be displayed to the communication application to allow a user to define or characterize the items; associate the visualization with a conversation that includes the communication; and provide the visualization to be displayed to the communication application in conjunction with the conversation.

According to some examples, the connected visualization module may be further configured to present an option to add one or more sub-items to an item, where the sub-items are selected based on a type of the item; and present a prompt to enter or select information to be included with each of the added sub-items. The sub-items may include one or more of people information, calendar items, tasks, notes, and attachments. The sub-items may further include one or more of an interactive feature and a control to launch an application. The prompt may be selected based on a type of a selected sub-item to be added to the item. The connected visualization module may be further configured to select one or more of a shape, a format, and a layout of the items based on a type of the items.

According to further examples, a system to provide conversation connected visualization of items based on a user created list is described. The system may include a first server configured to execute a productivity service; a second server configured to execute a communication service; and a third server configured to execute a connected visualization service. The connected visualization service may be configured to receive a list of items in a communication based on inferring an indication to generate the visualization from an entry of the list of items, or detecting activation of a visualization control on a user interface of the communication; determine a plurality of connections between the items on the list; generate a visualization of the items and the plurality of connections, wherein the items are represented as nodes; provide one or more prompts to be displayed to the communication application to allow a user to define or characterize the items; associate the visualization with a conversation that includes the communication; and provide the visualization to be displayed to the communication application in conjunction with the conversation.

According to yet other examples, the visualization may be stored in a separate data store and connected to the conversation. The visualization may also be stored with the conversation. The connected visualization service may be further configured to provide an indication of availability of one or more visualizations associated with a communication on a communication user interface. The connected visualization service may also be configured to provide an indication of availability of one or more visualizations associated with one or more communications on a conversation user interface.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide conversation connected visualization of items based on a user created list, the method comprising:
   automatically extracting a list of items from a communication based on one of:
      analysis of textual content entered into a body of the communication using natural language processing, and
      receipt of one of a bulleted list and a numbered list entered into the body of the communication;

determining, with a processor of a computing device, a plurality of connections between the items on the list;

analyzing the items on the list to determine a type of each of the items on the list;

automatically generating, with the processor, a visualization of the items and the plurality of connections based on the type of each of the items on the list;

providing, with the processor, one or more prompts to allow a user to define or characterize the items;

associating the visualization with a conversation that includes the communication; and providing the visualization to be displayed by a client application in conjunction with the conversation.

2. The method of claim 1, wherein automatically extracting a list of items from a communication comprises one of:

inferring an indication to generate the visualization from an entry of the list of items; and detecting activation of a visualization control on a user interface of the communication.

3. The method of claim 1, further comprising:

presenting an option to add one or more sub-items to an item, wherein the sub-items are selected based on a type of the item.

4. The method of claim 3, further comprising:

presenting a prompt to enter or select information to be included with each of the added sub-items.

5. The method of claim 1, wherein the communication is one of an email, a text message, and an online meeting exchange.

6. A computing device to provide conversation connected visualization of items based on a user created list, the computing device comprising:

a communication interface configured to facilitate communication between the computing device and one or more servers;

a memory configured to store instructions; and one or more processors coupled to the memory, wherein the one or more processors, in conjunction with the instructions stored in the memory, are configured to execute components of a communication service, the components of the communication service comprising:

an application configured to provide processing capability associated with a document;

a communication application configured to facilitate exchange of communications between users; and a connected visualization module configured to:

automatically extract a list of items in a communication based on one of:

analysis of textual content entered into a body of the communication using natural language processing, and receipt of one of a bulleted list and a numbered list entered into the body of the communication;

determine a plurality of connections between the items on the list;

analyze the items on the list to determine a type of each of the items on the list;

automatically generate a visualization of the items and the plurality of connections based on the type of each of the items on the list;

provide one or more prompts to be displayed to the communication application to allow a user to define or characterize the items; and associate the visualization with a conversation that includes the communication.

7. The computing device of claim 6, wherein the connected visualization module is further configured to:

present an option to add one or more sub-items to an item, wherein the sub-items are selected based on a type of the item; and present a prompt to enter or select information to be included with each of the added sub-items.

8. The computing device of claim 7, wherein the sub-items include one or more of people information, calendar items, tasks, notes, and attachments.

9. The computing device of claim 8, wherein the sub-items further include one or more of an interactive feature and a control to launch an application.

10. The computing device of claim 7, wherein the prompt is selected based on a type of a selected sub-item to be added to the item.

11. The computing device of claim 6, wherein the connected visualization module is further configured to:

select one or more of a shape, a format, and a layout of the items based on a type of the items; and provide the visualization to be displayed to the communication application in conjunction with the conversation.

12. A system to provide conversation connected isolation of items based on a user created list, the system comprising:

a first server configured to execute a productivity services;

a second server configured to execute a communication service; and a third server configured to execute a connected visualization service, wherein the connected visualization service is configured to:

automatically extract a list of items in a communication based on one of:

analysis of textual content entered into a body of the communication using natural language processing, and receipt of one of a bulleted list and a numbered list entered into the body of the communication;

determine a plurality of connections between the items on the list;

analyze the items on the list to determine a type of each of the items on the list;

automatically generate a visualization of the items and the plurality of connections based on the type of each of the items on the list, wherein the items are represented as nodes;

provide one or more prompts to be displayed to the communication application to allow a user to define or characterize the items; and associate the visualization with a conversation that includes the communication.

13. The system of claim 12, wherein the visualization is stored in a separate data store and connected to the conversation.

14. The system of claim 12, wherein the visualization is stored with the conversation.

15. The system of claim 12, wherein the connected visualization service is further configured to provide an indication of availability of one or more visualizations associated with a communication on a communication user interface.

16. The system of claim 12, wherein the connected visualization service is further configured to provide an indication of availability of one or more visualizations associated with one or more communications on a conversation user interface.

* * * * *